(No Model.) 2 Sheets—Sheet 1.

J. B. CASEBOLT.
CABLE RAILWAY.

No. 295,148. Patented Mar. 18, 1884.

Witnesses,
E. A. Brandau
Henry C. Lee

Inventor
J. B. Casebolt
by J. E. Martenrede
atty.

(No Model.) 2 Sheets—Sheet 2.

J. B. CASEBOLT.
CABLE RAILWAY.

No. 295,148. Patented Mar. 18, 1884.

Witnesses,
E. A. Brandau
Henry C. Lee

Inventor,
J. B. Casebolt
by J. A. Monteverde
Atty.

UNITED STATES PATENT OFFICE.

JOHNATHAN B. CASEBOLT, OF SAN FRANCISCO, CALIFORNIA.

CABLE RAILWAY.

SPECIFICATION forming part of Letters Patent No. 295,148, dated March 18, 1884.

Application filed June 30, 1883. (No model.)

*To all whom it may concern:*

Be it known that I, JOHNATHAN B. CASEBOLT, of San Francisco, county of San Francisco, and State of California, have invented an Improvement in Cable Railways; and I hereby declare the following to be a full, clear, and exact description thereof.

My invention relates to certain improvements in cable railways, and refers more especially to a means for turning corners and changing the direction of the cable; and it consists of a series of pulleys mounted in adjustable supporting boxes or cases supported from the frame-work of the tube and capable of lateral adjustment, so as to support the cable as it passes around the corner, and maintain it in a position practically beneath the slot through which the grip-shank works, as will be more fully explained by reference to the accompanying drawings, in which—

Figures 1, 2:
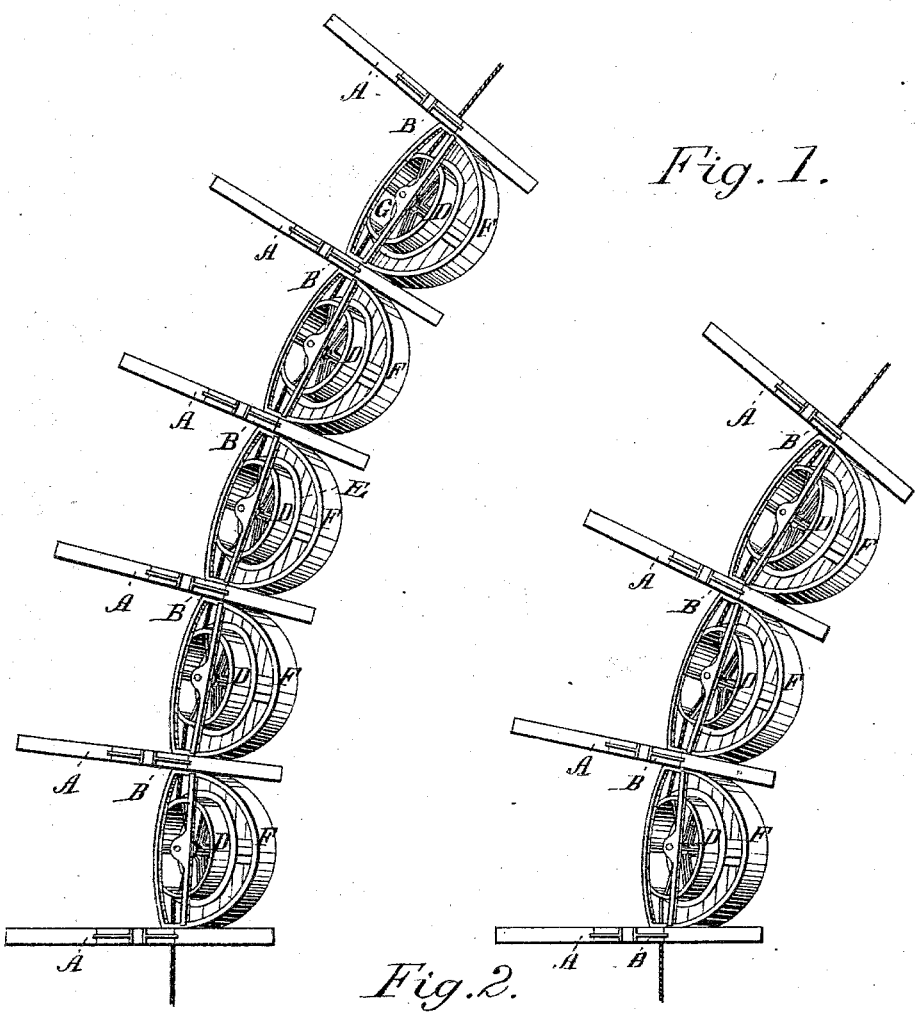
Figure 3:
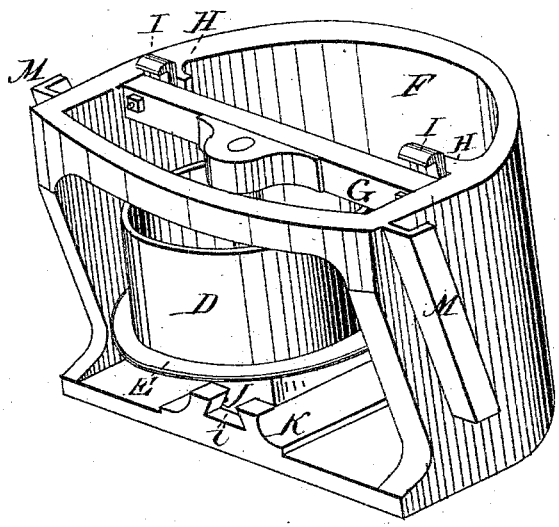
Figure 6:
Figure 4:
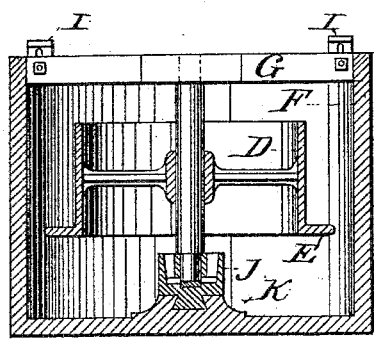
Figure 5:
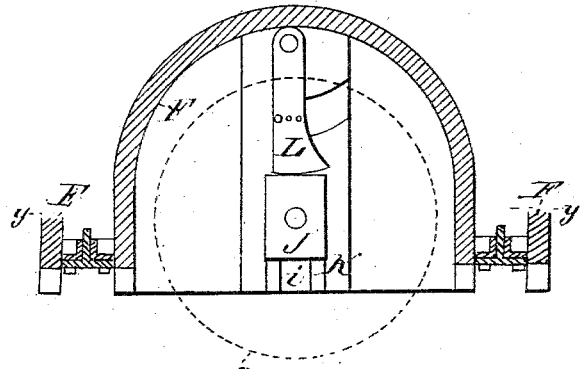

Figure 1, Sheet 1, is a plan view of my device, showing a portion of a curve of a cable railway. Fig. 2 is a transverse section through the tube, showing a side elevation of the ribs A, and the semi-cylindrical case F, containing the drum D, on an enlarged scale. Fig. 3, Sheet 2, is a perspective view of my device. Fig. 4 is a vertical section on line *y y*, Fig. 5. Fig. 5 is a plan. Fig. 6 is a view of the wedge I.

A are the ribs, which are bent to form the outline and support of the cable tube or tunnel, and B are the braces bolted to these ribs, which extend up and support the slot-irons C, the rails upon which the cars travel being supported upon and secured to the outer ends of the ribs A. At any point where a curve is to be turned the tube is laid in the proper curve, as shown, and in order to carry the cable around this curve I employ pulleys D, which have flanges E upon one edge. These pulleys have vertical axes, and are supported upon journals which are adjustable for wear, and so as to keep the pulleys to their place and retain the cable in the proper position, as follows:

F is a semi-cylindrical case open at one end and upon its flat side, as shown. Across the upper open end is a strong bar, G, having a box in its center, to receive the upper end of the pulley-shaft. The ends of this bar are kept in place by lugs H, and the bar, with its box, is adjusted to any desired point by means of keys or wedges I, which are slotted, so as to fit over the bolts by which the ends of the bar are secured to the lugs. The lower end of the pulley-shaft turns in a box, J, which slides in ways or guides K, and has a cam-shaped arm, L, pivoted behind it, by which it may be moved forward and adjusted when necessary. This cam has an adjusting-pin and corresponding holes or lugs in the box to receive it, and hold an arch at any desired point. The slot or channel between the guides, in which the box J travels, is carried out at one side, as shown at *i*, so that any dirt or grease which may fall into it may be easily pushed out and not prevent the free working of the box. By means of these adjustments the boxes may be easily set up and the pulleys brought to any desired point. The exterior D-shaped cases F are supported upon the slot-iron braces B by means of angular plates M, which are firmly bolted to the sides of the cases at such an angle that when they are secured to these braces the pulleys will stand in the desired positions to receive the rope. These cases, being rigidly connected with the slot-iron braces upon each side, (each being set between two of the braces,) form a portion of the structure, and it is thus made solid and continuous.

Having thus described my invention, what I claim as new, and desire to secure by Letters Patent, is—

1. In a cable railway having the ribs and slot-iron braces, as shown, the pulleys D, flanged at their lower ends and turning upon vertical axes, in combination with the cases or boxes F, bolted to the ribs, substantially as herein described.

2. In a cable railway, and in combination with the ribs and slot-iron braces, the flanged pulleys D, mounted in the cases F, and having their vertical shaft-journals adjustable at top or bottom, substantially as herein described.

3. The flanged pulleys D, turning upon the vertical shafts within the exterior cases, F, in combination with the bars G, supporting-lugs H, and slotted adjusting keys or wedges, substantially as herein described.

4. The flanged pulleys D, turning upon the vertical shafts within the exterior cases, F, in combination with the boxes or steps J, moving in guides K, and the cam or cam-shaped lever-arm L, substantially as herein described.

5. The case F, containing the pulley D, with its vertical shaft turning in boxes at G and J, in combination with the adjusting-keys at the top, and the box or step-guide K at the bottom, having the open slot $i$, substantially as herein described.

In witness whereof I have hereunto set my hand.

JOHNATHAN B. CASEBOLT.

Witnesses:
F. E. MONTEVERDE,
JOHNSON REYNOLDS.